United States Patent
Suzuki

(10) Patent No.: US 10,528,275 B2
(45) Date of Patent: Jan. 7, 2020

(54) STORAGE SYSTEM, STORAGE CONTROL DEVICE, AND METHOD OF CONTROLLING A STORAGE SYSTEM

(71) Applicant: FUJITSU LIMITED, Kawasaki-shi, Kanagawa (JP)

(72) Inventor: Toshihiko Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 21 days.

(21) Appl. No.: 15/615,269

(22) Filed: Jun. 6, 2017

(65) Prior Publication Data
US 2018/0039439 A1 Feb. 8, 2018

(30) Foreign Application Priority Data
Aug. 5, 2016 (JP) .................. 2016-154241

(51) Int. Cl.
*G06F 3/06* (2006.01)
*G06F 12/08* (2016.01)
*G06F 11/14* (2006.01)
*G06F 12/02* (2006.01)
*G06F 11/20* (2006.01)

(52) U.S. Cl.
CPC .......... *G06F 3/0628* (2013.01); *G06F 3/0646* (2013.01); *G06F 11/1441* (2013.01); *G06F 11/2058* (2013.01); *G06F 11/2079* (2013.01); *G06F 12/0238* (2013.01); *G06F 3/0653* (2013.01); *G06F 2212/7202* (2013.01); *G06F 2212/7203* (2013.01); *G06F 2212/7204* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 5,459,856 A | 10/1995 | Inoue | |
| 5,802,561 A * | 9/1998 | Fava | G06F 11/2087 711/120 |
| 6,321,298 B1 * | 11/2001 | Hubis | G06F 11/2089 711/113 |

(Continued)

FOREIGN PATENT DOCUMENTS

| | | |
|---|---|---|
| JP | 4-84215 | 3/1992 |
| JP | 5-158797 | 6/1993 |

*Primary Examiner* — Kaushikkumar M Patel
(74) *Attorney, Agent, or Firm* — Staas & Halsey LLP

(57) ABSTRACT

A storage system includes a first storage control device including a first memory being a volatile memory and a first processor, and a second storage control device including a second memory being a non-volatile memory and a second processor, wherein the second processor is configured to receive a first write request to write first data into a first storage device, store the first data into the second memory, and transmit the first data to the first storage control device, the first processor is configured to store the first data into the first memory, and transmit a first notification to the second storage control device, and the second processor is configured to receive the first notification, transmit a first completion notification in response to the first write request, and execute processing to write the first data, stored in the second memory, into the first storage device.

20 Claims, 15 Drawing Sheets

(56) References Cited

U.S. PATENT DOCUMENTS

| | | | | |
|---|---|---|---|---|
| 6,567,889 B1* | 5/2003 | DeKoning | ............ | G06F 3/0601 |
| | | | | 711/113 |
| 6,574,709 B1* | 6/2003 | Skazinski | ........... | G06F 11/2092 |
| | | | | 711/119 |
| 6,965,979 B2* | 11/2005 | Burton | ................ | G06F 11/1666 |
| | | | | 711/119 |
| 7,421,538 B2* | 9/2008 | Bita | .................... | G06F 12/0866 |
| | | | | 711/100 |
| 9,785,561 B2* | 10/2017 | Ash | ...................... | G06F 12/0866 |
| 2001/0047412 A1* | 11/2001 | Weinman, Jr. | ...... | G06F 11/2058 |
| | | | | 709/225 |
| 2002/0046330 A1* | 4/2002 | Suzuki | ................ | G06F 11/2064 |
| | | | | 711/162 |
| 2003/0158999 A1* | 8/2003 | Hauck | ................. | G06F 12/0866 |
| | | | | 711/113 |
| 2004/0059870 A1* | 3/2004 | Ash | .................... | G06F 11/1666 |
| | | | | 711/119 |
| 2005/0063216 A1* | 3/2005 | Wilkins | .............. | G06F 11/1666 |
| | | | | 365/154 |
| 2006/0143407 A1* | 6/2006 | Humlicek | ........... | G06F 12/0804 |
| | | | | 711/143 |
| 2006/0212644 A1* | 9/2006 | Acton | ....................... | G06F 1/30 |
| | | | | 711/103 |
| 2012/0054441 A1* | 3/2012 | Nakashima | ......... | G06F 11/1441 |
| | | | | 711/124 |
| 2014/0281123 A1* | 9/2014 | Weber | ................ | G06F 12/0246 |
| | | | | 711/103 |
| 2015/0370713 A1* | 12/2015 | Morishita | ............... | G06F 13/10 |
| | | | | 711/119 |
| 2016/0306744 A1* | 10/2016 | Kampe | ................. | G06F 3/0619 |
| 2017/0046259 A1* | 2/2017 | McKean | ............. | G06F 12/0804 |

* cited by examiner

STORAGE SYSTEM, STORAGE CONTROL DEVICE, AND METHOD OF CONTROLLING A STORAGE SYSTEM

CROSS-REFERENCE TO RELATED APPLICATION

This application is based upon and claims the benefit of priority of the prior Japanese Patent Application No. 2016-154241, filed on Aug. 5, 2016, the entire contents of which are incorporated herein by reference.

FIELD

The embodiments discussed herein are related to a storage system, a storage control device, and a method of controlling a storage system storage control program.

BACKGROUND

An access control technique employing a cache has been widely used as a technique to improve a readout performance from a memory device. In this technique, part of data in the memory device is temporarily held in the cache. If particular data is held in the cache at the time when a request for reading out the particular data is received, the data is read out of the cache instead of the memory device.

Meanwhile, there are also known techniques to increase failure resistance by duplicating data stored in a cache. For example, there is proposed a technique to store write data in any one of two cache units and in any one of two non-volatile memory units. In the meantime, there is also proposed a technique to complete a write command at a point of time when write data from a host computer to a main drive is written in both a disk cache and a backup memory. Such related art has been disclosed in Japanese Laid-open Patent Publications Nos. 5-158797 and 4-84215.

SUMMARY

According to an aspect of the invention, a storage system includes a first storage control device including a first memory and a first processor coupled to the first memory, the first memory being a volatile memory, and a second storage control device including a second memory and a second processor coupled to the second memory, the second memory being a non-volatile memory, wherein the second processor is configured to receive a first write request to write first data into the first storage device, store the first data into the second memory, and transmit the first data to the first storage control device, the first processor is configured to receive the first data from the second processor, store the first data into the first memory, and transmit a first notification to the second storage control device after storing the first data into the first memory, and the second processor is configured to receive the first notification from the first processor, transmit a first completion notification in response to the first write request after storing the first data into the second memory and receiving the first notification, and execute processing to write the first data, stored in the second memory, into the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A cache region is often reserved in a non-volatile memory in order to improve a readout performance. In this configuration, however, data stored in the cache is lost in case of occurrence of a blackout. Hence it is supposed to provide a non-volatile memory device to back up the data in the cache and a battery to supply electric power to be used to copy the data in the cache to the non-volatile memory device immediately after the occurrence of the blackout.

Meanwhile, a possible method of curtailing the non-volatile memory device for backup and the battery is a method of reserving a cache region in a non-volatile memory. In this case, however, there is a problem of deterioration in write response performance to a host device due to a decline in speed of writing into the cache.

[First Embodiment]

Figure 1:
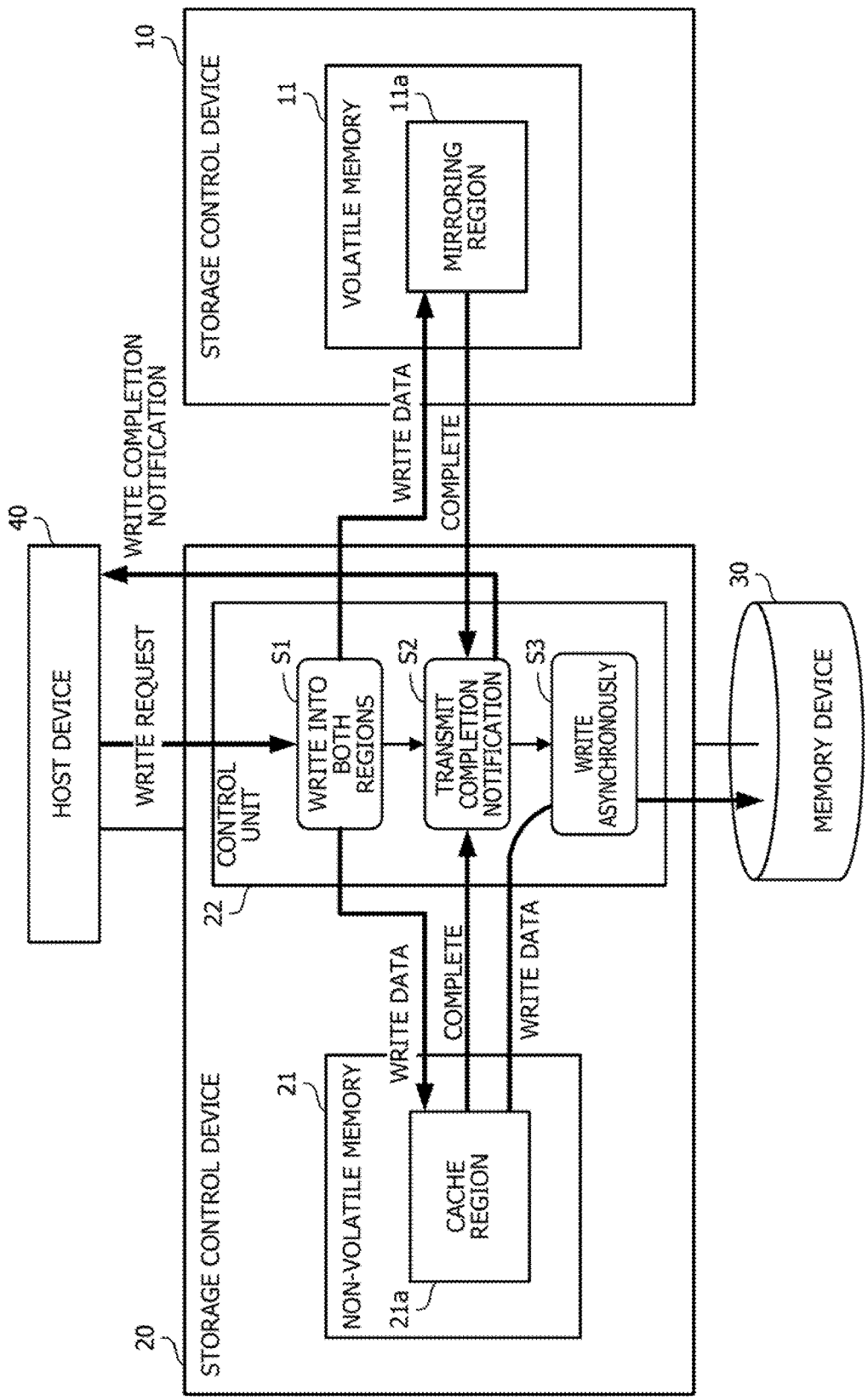
FIG. 1 is a diagram illustrating a configuration example and a processing example of a storage system according to a first embodiment.

FIG. 1 is a diagram illustrating a configuration example and a processing example of a storage system according to a first embodiment. The storage system illustrated in FIG. 1 includes storage control devices 10 and 20. Moreover, a memory device 30 and a host device 40, for example, are coupled to the storage control device 20.

The storage control device 10 includes a volatile memory 11. A dynamic random access memory (DRAM) is used as the volatile memory 11, for example. The volatile memory 11 includes a mirroring region 11a used for mirroring of data stored in a cache region 21a to be described later.

The storage control device 20 controls access to the memory device 30 in response to a request from the host device 40. Here, the memory device 30 represents an example of a memory region subject to access from the host device 40. The storage control device 20 includes a non-volatile memory 21 and a control unit 22.

The non-volatile memory 21 has a writing speed which is faster than that of the memory device 30. A storage class memory (SCM) is used as the non-volatile memory 21, for example. The non-volatile memory 21 includes the cache region 21a.

The control unit 22 is formed from one or more processors, for example. In this case, processing by the control unit 22 is realized by causing the processor or processors to execute given programs. By using the cache region 21a, the control unit 22 controls the access to the memory device 30 in response to the request from the host device 40. Specifically, the control unit 22 controls writing into the memory device 30 in accordance with the following procedures.

The control unit 22 receives from the host device 40 a write request for write data. Then, the host device 40 writes the write data into both the cache region 21a of the non-volatile memory 21 and the mirroring region 11a of the volatile memory 11 (step S1). Thereafter, when the writing of the write data into both of the regions is completed, the control unit 22 transmits a writing completion notification to the host device 40 (step S2).

Moreover, the control unit 22 writes the write data, which is written into the cache region 21a in step S1, into a predetermined region of the memory device 30 at a timing after the transmission of the writing completion notification, that is, asynchronously with the transmission (step S3). A timing to execute step S3 is defined as a timing when a free space in the cache region 21a runs short and a frequency of access to the write data written in step S1 reaches the lowest in the cache region 21a, for example.

In the above-described storage control device 20, since the cache region 21a is reserved in the non-volatile memory 21, the data in the cache region 21a is maintained without being lost even when operations of both of the storage control devices 10 and 20 are stopped due to a blackout. Accordingly, the storage control device 20 does not have to mount another non-volatile memory device for backing up the data in the cache region 21a or a battery for executing the backup processing in case of the blackout. Thus, it is possible to suppress a manufacturing cost and a device size of the storage control device 20.

Moreover, in the configuration of FIG. 1, write time of the write data into the cache region 21a is highly likely to be longer than that in the case of reserving the cache region 21a in the volatile memory such as the DRAM. Such an increase in write time may cause deterioration in write response performance to the host device 40. Meanwhile, in addition to the writing processing into the volatile memory 11, the mirroring processing of the write data into the mirroring region 11a includes data transfer processing between the storage control device 10 and the storage control device 20, and the like.

For this reason, at least part of the increase in time to write into the cache region 21a described above is offset by the time for the mirroring processing involving the mirroring region 11a. Accordingly, the reservation of the cache region 21a in the non-volatile memory 21 in order to curtail the backup processing at the time of occurrence of a blackout makes it possible to reduce an adverse effect on the write response performance to the host device 40. For instance, even if the write response performance is deteriorated, a range of the deterioration may be suppressed.

Here, since mirror data derived from the data in the cache region 21a is held in the mirroring region 11a, it is possible to leave the data in the mirroring region 11a, which is the same data derived from as that in the cache region 21a, in case of an abnormal stop of the storage control device 20. Thus, the storage control device 10 is capable of promptly taking over the access control to the memory device 30, which is executed by the storage control device 20 while using the cache region 21a, by using the data in the mirroring region 11a.

[Second Embodiment]

Figure 2:
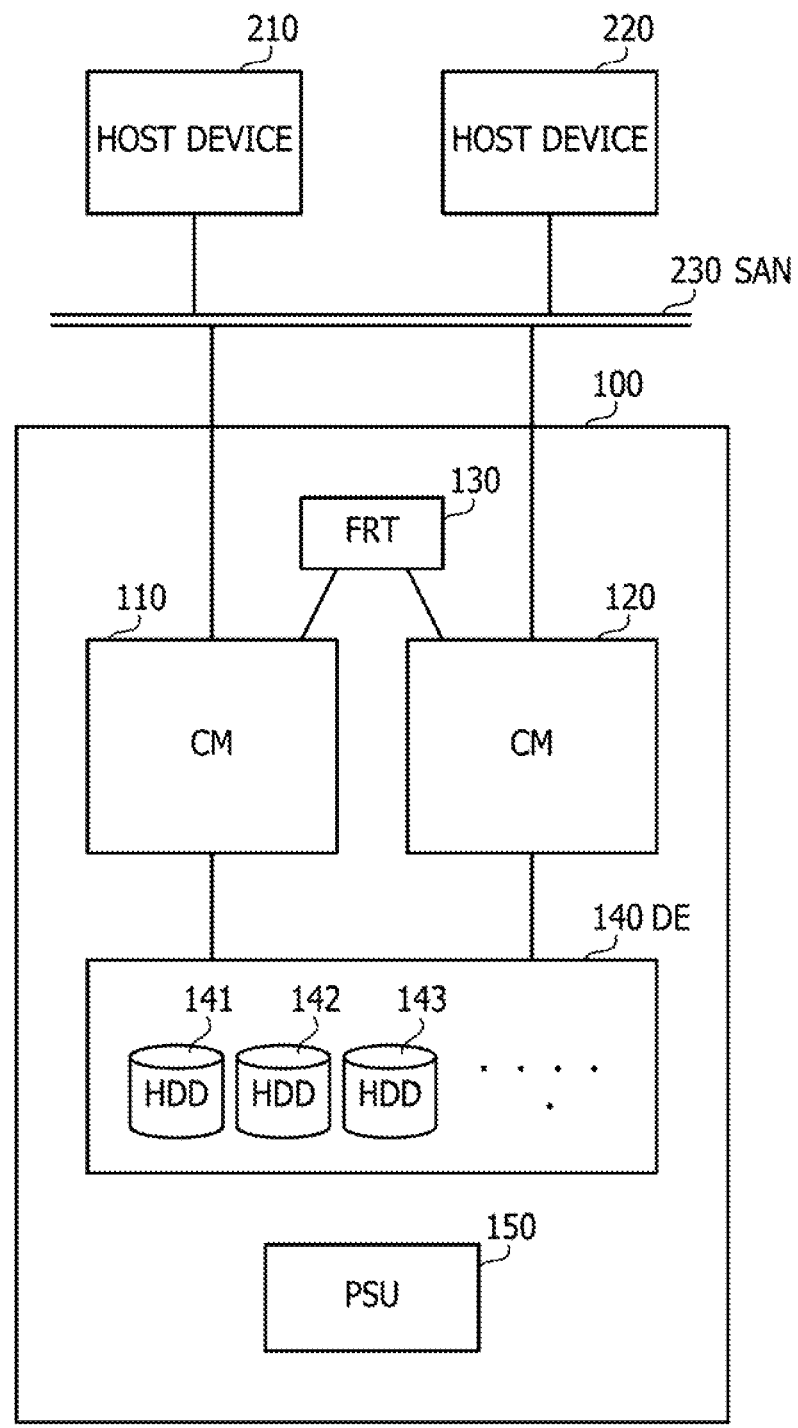
FIG. 2 is a diagram illustrating a configuration example of a storage system according to a second embodiment.

FIG. 2 is a diagram illustrating a configuration example of a storage system according to a second embodiment. The storage system illustrated in FIG. 2 includes a storage device 100, and host devices 210 and 220. The storage device 100 is coupled to the host devices 210 and 220 through a storage area network (SAN) 230, for example.

The storage device 100 includes controller modules (CMs) 110 and 120, a frontend router (FRT) 130, a drive enclosure (DE) 140, and a power supply unit (PSU) 150.

Each of the CMs 110 and 120 is a storage control device which controls access to memory devices mounted on the DE 140 in response to a request from the host device 210 or the host device 220. The CM 110 controls the access to the memory devices in the DE 140 by using a cache inside the CM 110. Likewise, the CM 120 controls the access to the memory devices in the DE 140 by using the cache inside the CM 120.

Moreover, the CM 110 and the CM 120 are coupled to each other through the FRT 130, and are capable of transmitting and receiving data to and from each other. In particular, between the CM 110 and the CM 120, it is possible to transfer data from a RAM provided in one of the CMs to a RAM provided in the other CM by using direct memory access (DMA) controllers respectively provided therein.

In this embodiment, the above-mentioned data transfer between the RAMs through the FRT 130 is used for the cache mirroring. The data written in a cache region in the RAM of the CM 110 is also written by the CM 110 into the RAM in the CM 120 through the FRT 130. Likewise, the data written in the cache region in the RAM of the CM 120 is also written by the CM 120 into the RAM in the CM 110 through the FRT 130.

Multiple memory devices as access targets from the host devices 210 and 220 are mounted on the DE 140. As an example, in this embodiment, the DE 140 is assumed to be a disk array device which mounts hard disk drives (HDDs) 141, 142, 143, and so on as the memory devices. Note that the memory devices as the access targets from the host devices 210 and 220 may be non-volatile memory devices of different types such as solid state drives (SSDs).

The PSU 150 supplies electric power to the components in the storage device 100 based on electric power supplied from outside.

Each of the host devices 210 and 220 is a computer which accesses the memory devices in the DE 140 through any of the CMs 110 and 120.

Figure 3:
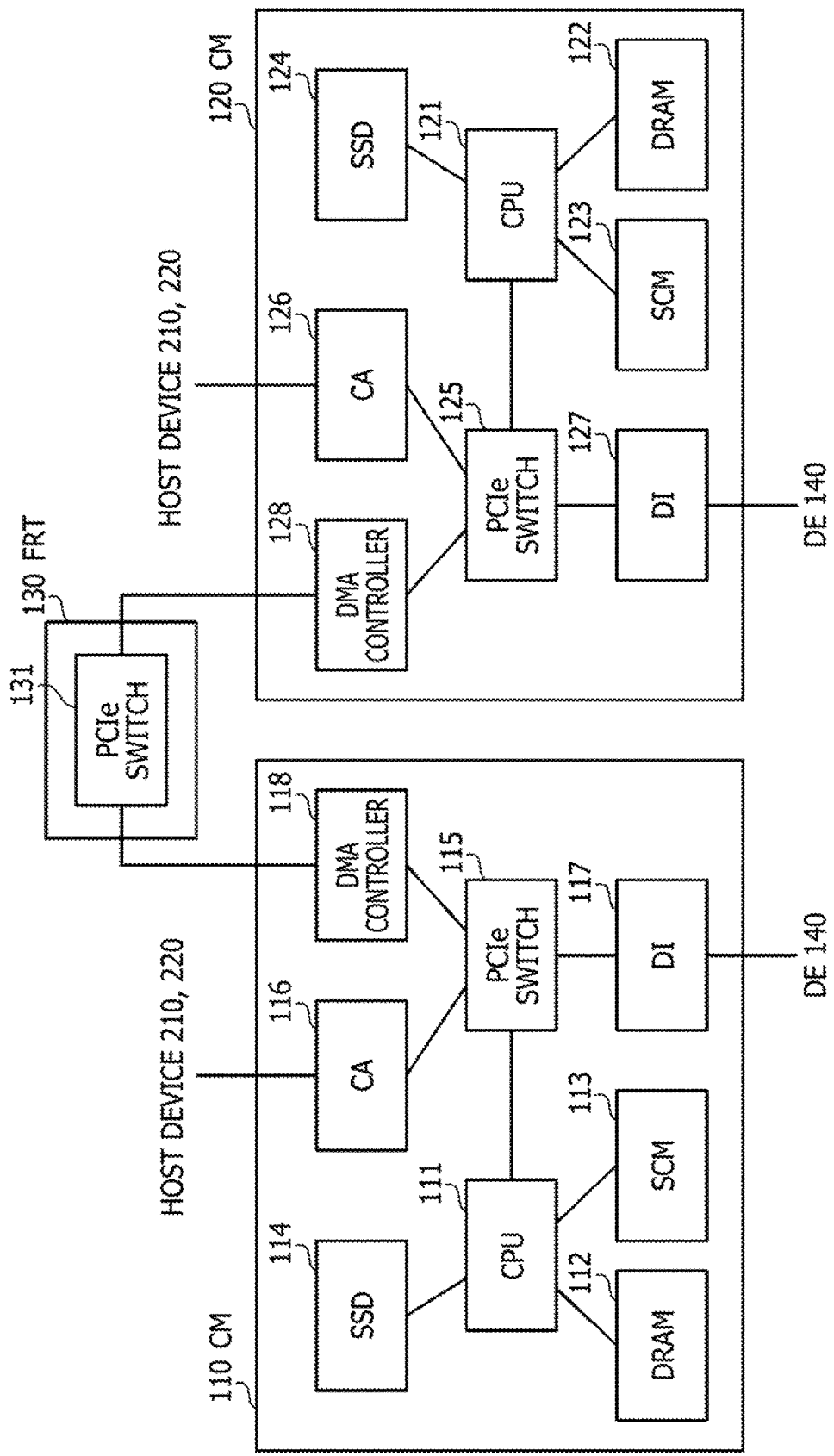
FIG. 3 is a diagram illustrating a hardware configuration example of CMs and an FRT.

FIG. 3 is a diagram illustrating a hardware configuration example of the CMs and the FRT.

The CM 110 includes a central processing unit (CPU) 111, a DRAM 112, an SCM 113, an SSD 114, a peripheral component interconnect express (PCIe) switch 115, a channel adapter (CA) 116, a drive interface (DI) 117, and a DMA controller 118.

The CPU 111 controls the overall CM 110. The CPU 111 includes one or more processors, for example. Moreover, the CPU 111 includes a memory controller which is not illustrated. The DMA controller 118 is capable of writing and reading the data to and from the DRAM 112 and the SCM 113 by the intermediary of the memory controller instead of through the processors of the CPU 111.

The DRAM 112 is used as a main memory device of the CM 110. At least part of operating system (OS) programs and application programs to be executed by the CPU 111 are temporarily stored in the DRAM 112. Moreover, various data used for processing by the CPU 111 are stored in the DRAM 112.

The SCM 113 is a non-volatile memory which has an access performance higher than that of the SSD 114 but lower than that of the DRAM 112. The SCM 113 reserves a cache region which is used at the time of the access control to the memory devices in the DE 140 in response to requests from the host devices 210 and 220. Note that the SCM 113 is realized by using a magnetoresistive RAM (MRAM), a ferroelectric RAM (FeRAM), a phase change RAM (PRAM), or a resistive RAM (ReRAM), for example.

The SSD 114 is used as an auxiliary memory device of the CM 110. The OS programs, the application programs, and the various data are stored in the SSD 114. Here, a non-volatile memory device of a different type such as an HDD may be used as the auxiliary memory device. In the meantime, the SSD 114 may be coupled to the CPU 111 through a chip set mounting a bus controller, and the like.

The CPU 111, the CA 116, the DI 117, and the DMA controller 118 are coupled to one another through the PCIe switch 115 and by using a PCIe bus. The PCIe switch 115 controls transmission and reception of the data to and from the CPU 111, the CA 116, the DI 117, and the DMA controller 118.

The CA 116 is an interface used for communication with the host devices 210 and 220 through the SAN 230. The CA 116 is a fibre channel (FC) interface, for example. The DI 117 is an interface used for communication with the memory devices in the DE 140. The DI 117 is a serial attached small computer system interface (SCSI) (SAS) interface, for example. The DMA controller 118 controls the data transfer between the DRAM 112 and the SCM 113 as well as between the DRAM 122 of the CM 120 and an SCM 123, without the intermediary of the CPU 111.

The CM 120 has the same hardware configuration as that of the CM 110. The CM 120 includes a CPU 121, a DRAM 122, the SCM 123, an SSD 124, a PCIe switch 125, a CA 126, a DI 127, and a DMA controller 128. The CPU 121, the DRAM 122, the SCM 123, the SSD 124, the PCIe switch 125, the CA 126, the DI 127, and the DMA controller 128 are constituents that correspond to the CPU 111, the DRAM 112, the SCM 113, the SSD 114, the PCIe switch 115, the CA 116, the DI 117, and the DMA controller 118, respectively, and description thereof will be omitted herein.

The FRT 130 includes a PCIe switch 131. The PCIe switch 131 is coupled to the DMA controller 118 of the CM 110 and to the DMA controller 128 of the CM 120. The data transfer between the DRAM 112 and the SCM 113 of the CM 110 as well as between the DRAM 122 and the SCM 123 of the CM 120 is executed by the intermediary of the DMA controller 118, PCIe switch 131, and the DMA controller 128 without the intermediary of the CPUs 111 and 121.

Note that in the above-described configuration, each of the CMs 110 and 120 represents an example of one of the storage control devices 10 and 20 in FIG. 1. When the CM 110 is the example of the storage control device 10, the DRAM 112 represents an example of the volatile memory 11 in FIG. 1. Meanwhile, when the CM 120 is the example of the storage control device 20, the SCM 123 represents an example of the non-volatile memory 21 in FIG. 1, the CPU 121 represents an example of the control unit 22 in FIG. 1, and the DE 140 represents an example of the memory device 30 in FIG. 1.

Figure 4:
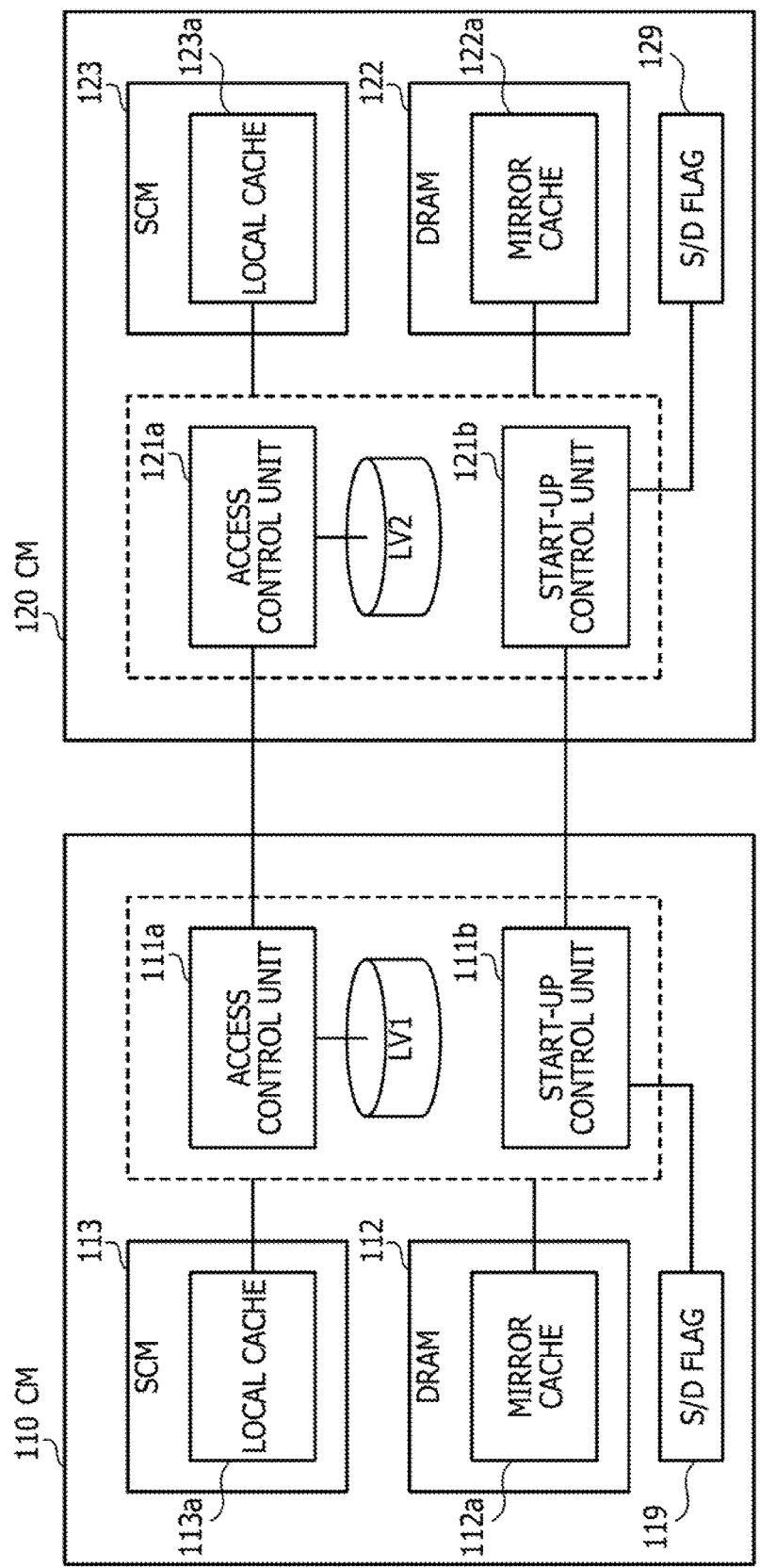
FIG. 4 is a block diagram illustrating an example of processing functions provided to the CMs.

FIG. 4 is a block diagram illustrating an example of processing functions provided to the CMs.

The CM 110 includes an access control unit 111a and a start-up control unit 111b. Processing by the access control unit 111a and the start-up control unit 111b is realized by causing the CPU 111 to execute given programs, for example. Meanwhile, a region of a local cache 113a is reserved in the SCM 113 and a region of a mirror cache 112a is reserved in the DRAM 112.

On the other hand, the CM 120 includes an access control unit 121a and a start-up control unit 121b. Processing by the access control unit 121a and the start-up control unit 121b is realized by causing the CPU 121 to execute given programs, for example. Meanwhile, a region of a local cache 123a is reserved in the SCM 123 and a region of a mirror cache 122a is reserved in the DRAM 122.

In the CM 110, the access control unit 111a controls access to the memory devices in the DE 140 in response to requests from the host devices 210 and 220. In this embodiment, the access control unit 111a is designed to control access to a logic volume LV1 that uses a memory region of the DE 140 in response to a request from the host device 210 when the CM 110 is operated normally The access control unit 111a controls the access to the logic volume LV1 while using the local cache 113a as a cache. In the meantime, when there is a request for writing in the logic volume LV1, the access control unit 111a performs the writing not only into the local cache 113a but also into the mirror cache 122a of the CM 120. Thus, the data in the local cache 113a is mirrored into the mirror cache 122a.

The start-up control unit 111b executes processing at the time of shut-down and at the time of start-up concerning the access control function. When the CM 110 shuts down normally, the start-up control unit 111b updates a shut-down (S/D) flag 119 from "0" to "1". Here, the shut-down flag 119 is stored in the non-volatile memory device (such as the SSD 114) in the CM 110. Moreover, an initial value of the shut-down flag 119 is set to "0".

When the CM 110 starts up, the start-up control unit 111b executes start-up processing corresponding to the shut-down flag 119. When the shut-down flag 119 is set to "1", the start-up control unit 111b executes normal start-up processing in order to start the access control. On the other hand, when the shut-down flag 119 is set to "0", the start-up control unit 111b executes restoration processing in order to recover from a state of an abnormal end attributed to a blackout. The restoration processing includes processing to recover the data in the mirror cache 112a before the occurrence of the blackout by reading the data out of the local cache 123a of the CM 120 and storing the data in the mirror cache 112a.

The access control unit 121a and the start-up control unit 121b of the CM 120 execute the same processing as that executed by the access control unit 111a and the start-up control unit 111b of the CM 110, respectively.

When the CM 120 is operated normally, the access control unit 121a controls access to a logic volume LV2 that uses the memory region of the DE 140 in response to a request from the host device 220, while using the local cache 123a as a cache. Moreover, the access control unit 121a performs the mirroring of the data in the local cache 123a into the mirror cache 112a of the CM 110.

The start-up control unit 121b executes processing at the time of shut-down and at the time of start-up concerning the access control function by using a shut-down (S/D) flag 129. Here, the shut-down flag 129 is stored in the non-volatile memory device (such as the SSD 124) in the CM 120. When the start-up control unit 121b executes restoration processing from a blackout based on the value of the shut-down flag 129, the start-up control unit 121b reads the data out of the local cache 113a of the CM 110 and stores the data in the mirror cache 122a.

As described above, when the CM 110 is operated normally, the access control unit 111a controls the access to the logic volume LV1 while using the local cache 113a as the cache. Meanwhile, the access control unit 111a performs the mirroring of the data in the local cache 113a into the mirror cache 122a. In the meantime, when the CM 120 is operated normally, the access control unit 121a controls the access to the logic volume LV2 while using the local cache 123a as the cache. Meanwhile, the access control unit 121a performs the mirroring of the data in the local cache 123a into the mirror cache 112a.

Now, processing in the case where the operation of one of the CMs 110 and 120 is stopped due to occurrence of an anomaly such as a breakdown will be described with reference to FIG. 5.

Figure 5:
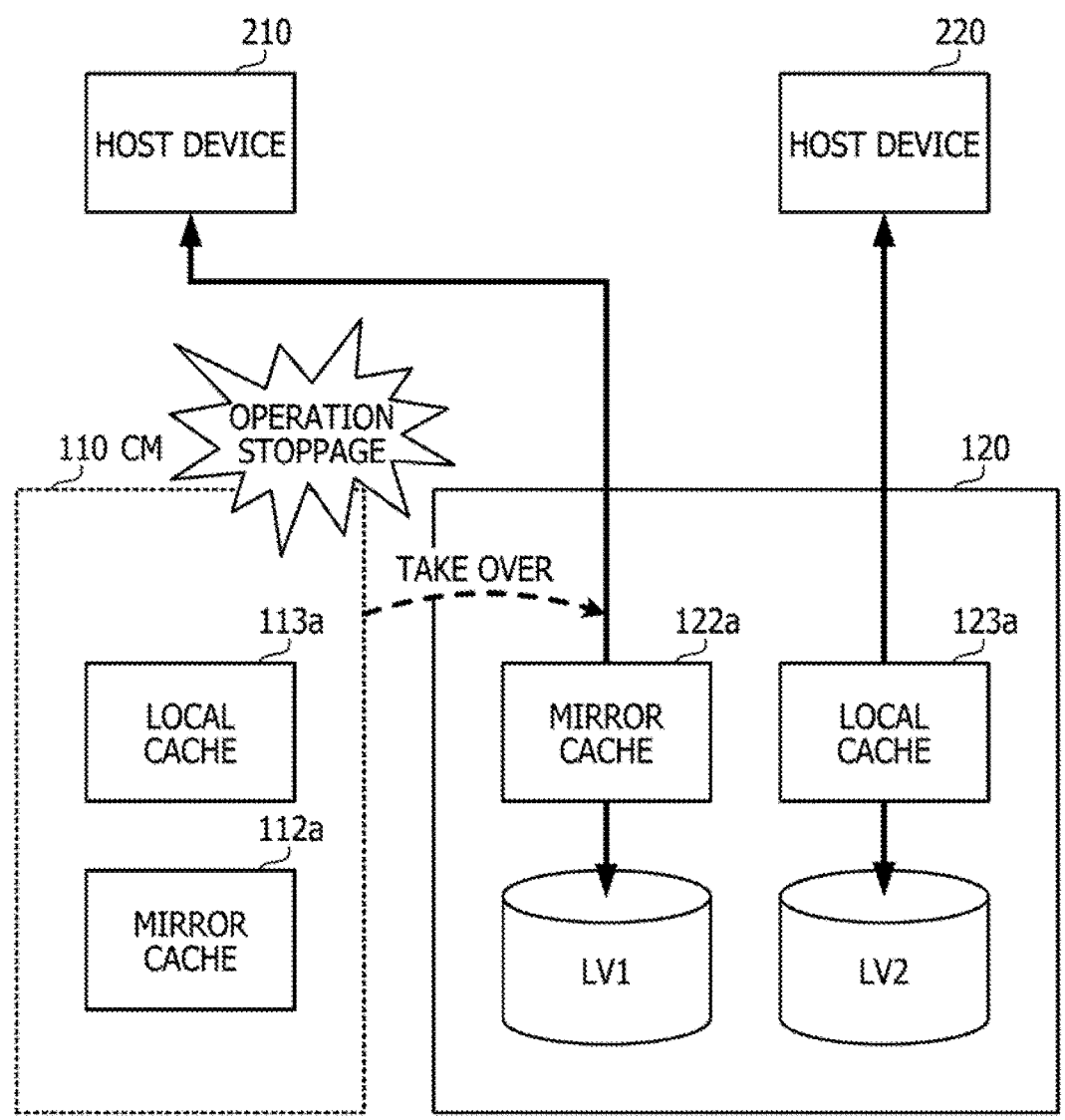
FIG. 5 is a diagram illustrating a processing example in the case where an operation of one of the CMs is stopped.

FIG. 5 is a diagram illustrating a processing example in the case where an operation of one of the CMs is stopped. As an example, FIG. 5 illustrates the case where the operation of the CM 110 is stopped due to occurrence of an anomaly. In this case, the data identical to the data in the local cache 113a of the CM 110 remains in the mirror cache 122a of the CM 120. Accordingly, the access control unit 121a of the CM 120 is capable of taking over the access control to the logic volume LV1 from the CM 110 while using the mirror cache 122a as the cache.

Meanwhile, although it is not illustrated, when the operation of the CM 120 is stopped as with the above-mentioned case, the access control unit 111a of the CM 110 is capable of taking over the access control to the logic volume LV2 from the CM 120 while using the mirror cache 112a as the cache.

Next, problems of a comparative example of the storage device will be described while illustrating the comparative example in FIGS. 6 and 7. Then, the description of the storage device 100 of this embodiment will be continued with reference to FIG. 8 and the like.

Figure 6:
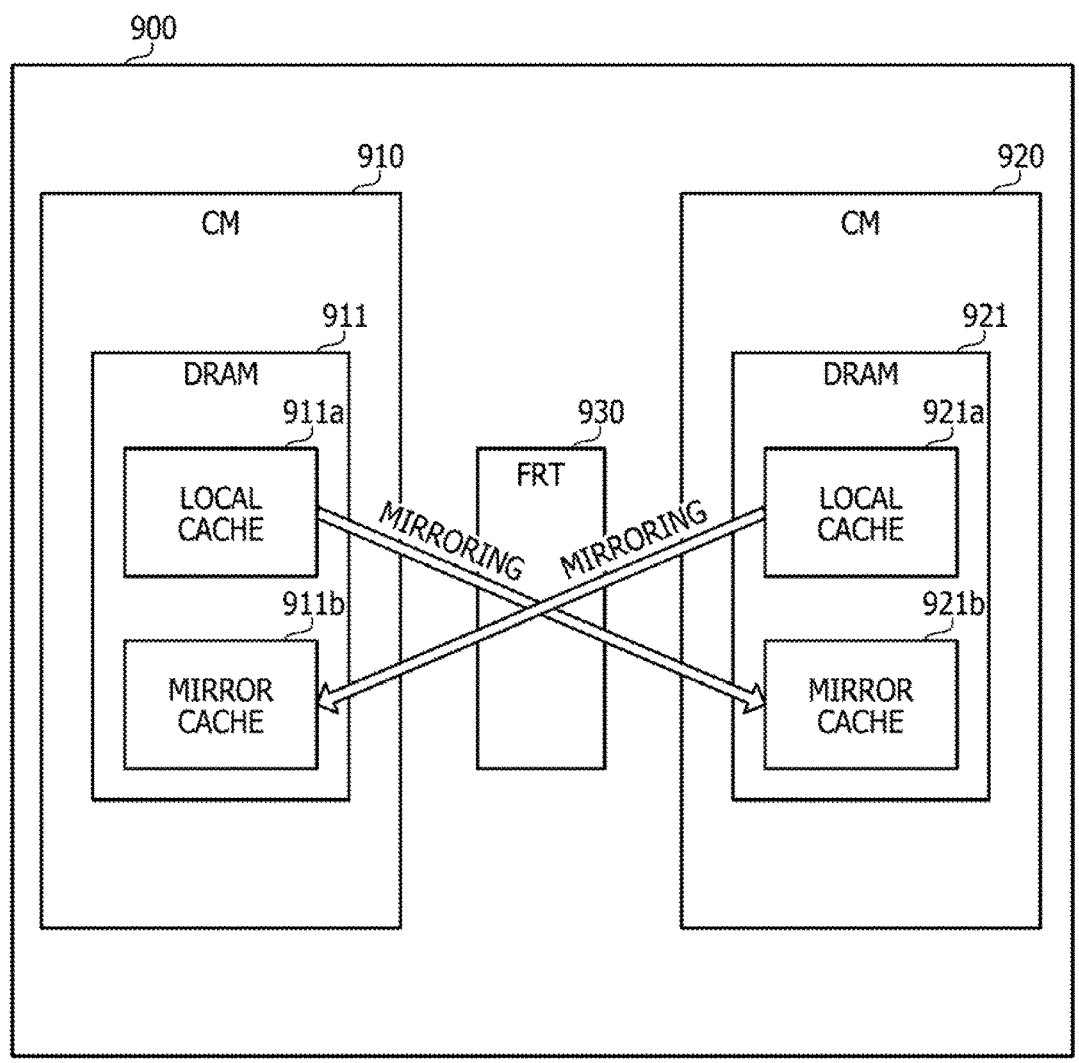
FIG. 6 is a diagram illustrating a mirroring method between caches in a comparative example of a storage device.

FIG. 6 is a diagram illustrating a mirroring method between caches in the storage device of the comparative example. A storage device 900 illustrated in FIG. 6 includes CMs 910 and 920, and an FRT 930.

The CM 910 includes a DRAM 911, and regions of a local cache 911a and of a mirror cache 911b are reserved in the DRAM 911. The CM 920 includes a DRAM 921, and regions of a local cache 921a and of a mirror cache 921b are reserved in the DRAM 921.

The CM 910 controls access to a given logic volume while using the local cache 911a as a cache. At the same time, the CM 910 performs mirroring of data in the local cache 911a into the mirror cache 921b of the CM 920 through the FRT 930.

The CM 920 controls access to a given logic volume while using the local cache 921a as a cache. At the same time, the CM 920 performs mirroring of data in the local cache 921a into the mirror cache 911b of the CM 910 through the FRT 930.

Figure 7:
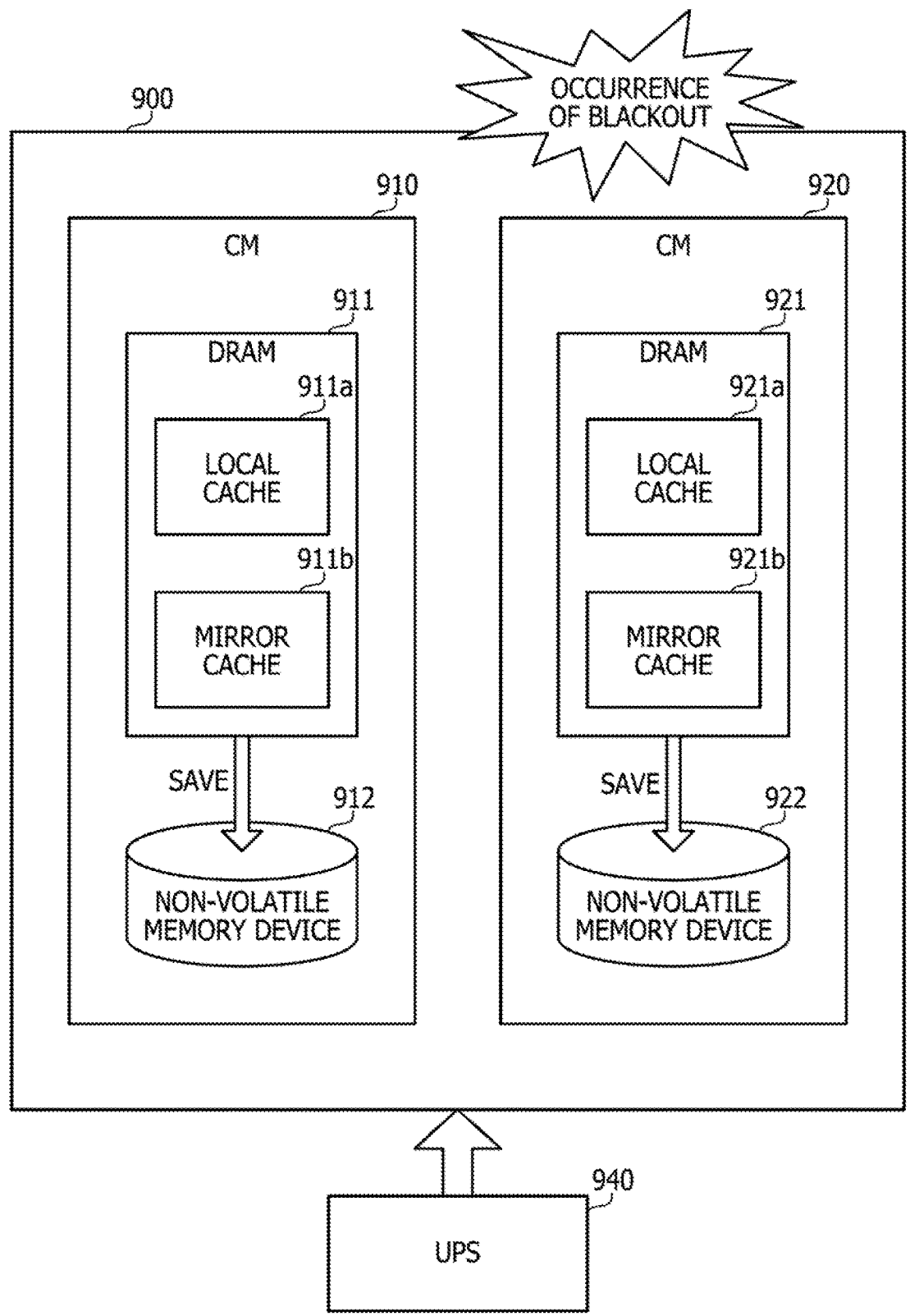
FIG. 7 is a diagram illustrating an operation at the time of occurrence of a blackout in the comparative example of the storage device.

FIG. 7 is a diagram illustrating an operation at the time of occurrence of a blackout in the storage device of the comparative example. If electric power supply to the CMs 910 and 920 is stopped due to occurrence of a blackout, the data in the local caches 911a and 921a are lost. As a method of not causing such data losses, there is a method of providing a backup non-volatile memory device and a battery that supplies electric power for saving the data located in the local caches into the non-volatile memory device after the blackout.

In the example of FIG. 7, the CM 910 is provided with a non-volatile memory device 912 and the CM 920 is provided with a non-volatile memory device 922. Moreover, an uninterruptible power supply (UPS) 940, which supplies electric power to the storage device 900 upon detection of the blackout, is coupled to the storage device 900. The UPS 940 has a built-in battery.

When the blackout occurs, the CM 910 saves at least the data located in the local cache 911a among the data in the DRAM 911 into the non-volatile memory device 912 by using the electric power from the UPS 940. In the meantime, the CM 920 saves at least the data located in the local cache 921a among the data in the DRAM 921 into the non-volatile memory device 922 by using the electric power from the UPS 940.

Thus, the CM 910 writes the data stored in the non-volatile memory device 912 back into the local cache 911a when the electric power supply is resumed, so as to properly resume the access control to the corresponding logic volume. Meanwhile, the CM 920 also writes the data stored in the non-volatile memory device 922 back into the local cache 921a when the electric power supply is resumed, so as to properly resume the access control to the corresponding logic volume.

However, the method of not causing data losses illustrated in FIG. 7 requests the battery that supplies the electric power in order to save the cache data, and the non-volatile memory device with quite a large capacity in order to back up the cache data. As a consequence, this method has problems of an increase in cost of the device and an increase in size of a housing.

In contrast to these problems, in the storage device 100 of the second embodiment, the regions for local caches are reserved in the non-volatile SCM. Now, the description of the storage device 100 of this embodiment will be continued.

Figure 8:
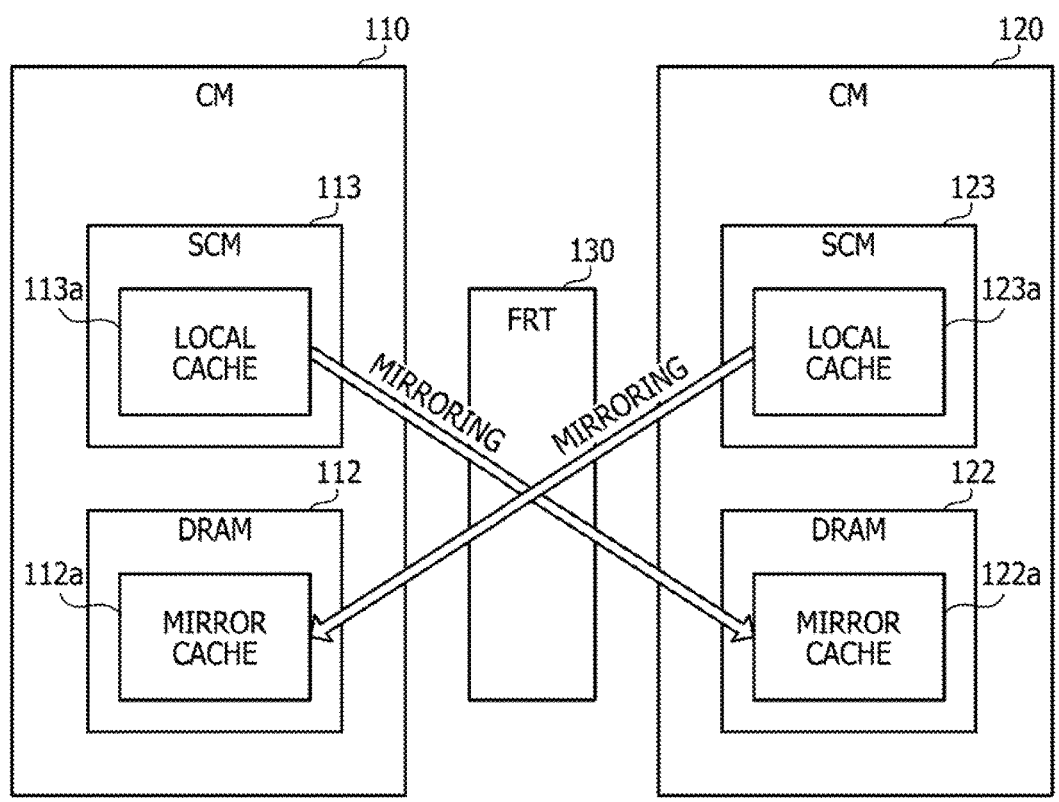
FIG. 8 is a diagram illustrating a layout of local caches and mirror caches in the second embodiment.

FIG. 8 is a diagram illustrating a layout of the local caches and the mirror caches in the second embodiment. In the storage device 100 of this embodiment, the region of the local cache 113a is reserved in the SCM 113 of the CM 110, and the region of the local cache 123a is reserved in the SCM 123 of the CM 120. Meanwhile, a region of a mirror cache 122a is reserved in a DRAM 122 of the counterpart CM 120, and the region of the mirror cache 112a is reserved in the DRAM 112 of the counterpart CM 110.

The CM 110 writes data, which is requested for writing from the host device 210, into the local cache 113a of the SCM 113. At the same time, the CM 110 transfers the data to the CM 120 and also writes the data into the mirror cache 122a of the DRAM 122. Thus, the write data is mirrored. Likewise, the CM 120 writes data, which is requested for writing from the host device 220, into the local cache 123a of the SCM 123. At the same time, the CM 120 transfers the data to the CM 110 and also writes the data into the mirror cache 112a of the DRAM 112. Thus, the write data is mirrored.

Figure 9:
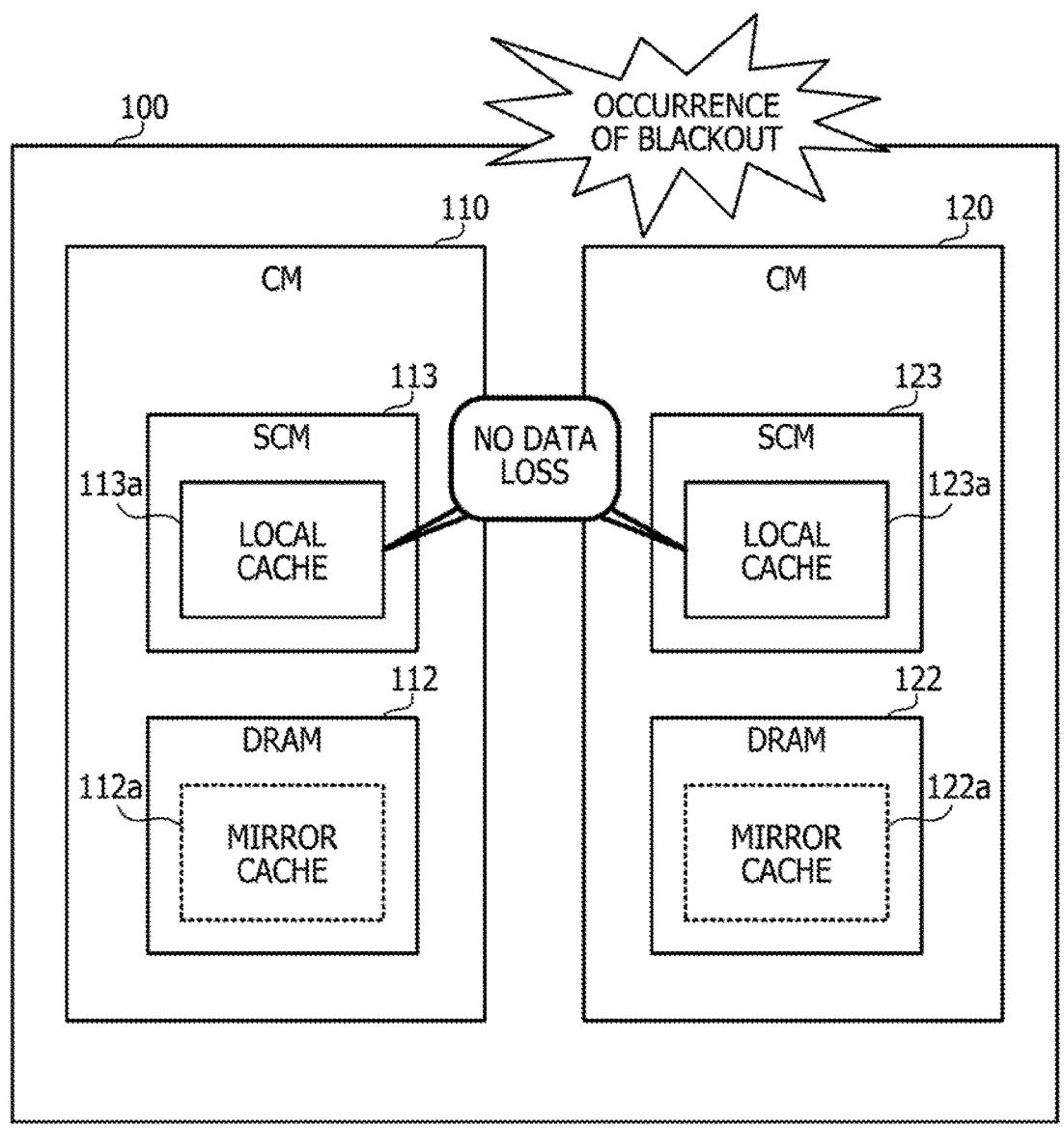
FIG. 9 is a diagram illustrating a state of the storage device at the time of occurrence of a blackout.

FIG. 9 is a diagram illustrating a state of the storage device at the time of occurrence of a blackout. When the electric power supply to the storage device 100 is stopped by the blackout as illustrated in FIG. 9, the data stored in the local cache 113a of the SCM 113 and the local cache 123a of the SCM 123, respectively, are retained without being lost. Since the regions of the local caches 113a and 123a are reserved in the non-volatile SCMs 113 and 123, the data stored in the local caches 113a and 123a are protected in case of occurrence of the blackout. For this reason, the battery and other non-volatile memory devices for backup do not have to be provided.

Here, each SCM has a higher access performance than that of an SSD. Moreover, a cost per unit capacity of the SCM is lower than that of the SSD as well, and a further reduction in this cost is anticipated in the future. Furthermore, the SCM is bit-accessible. From these reasons, the use of the SCMs for the regions of the local caches 113a and 123a enables improvement in the access performance and reduction in capacity cost as compared to the case of using the SSDs.

Figure 10:
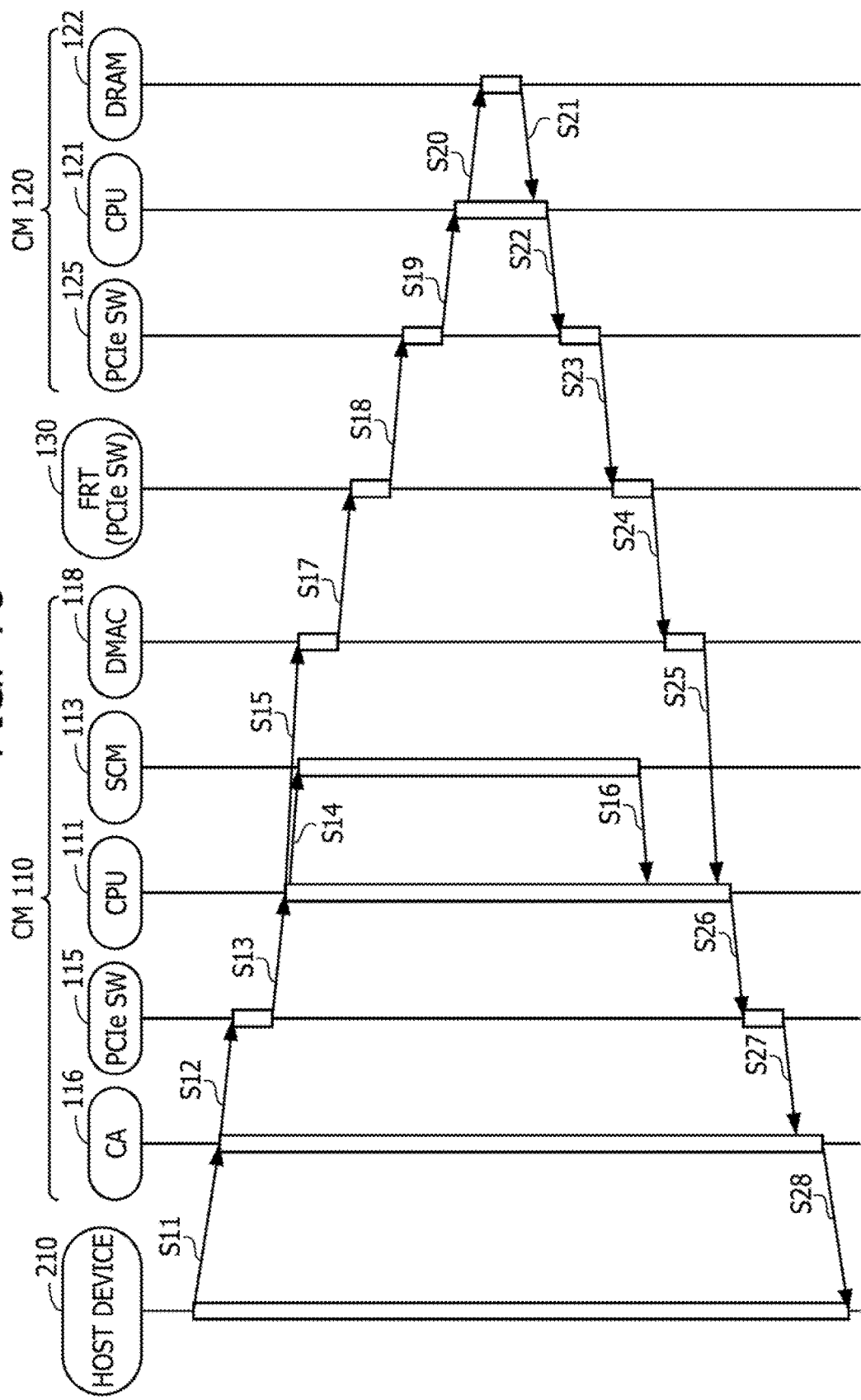
FIG. 10 is a sequence diagram illustrating an example of processing procedures of the storage device in the case where writing is requested.

Nonetheless, the access performance of each SCM is generally lower than that of the DRAM. When the regions of the local caches 113a and 123a are reserved in the SCMs, the access performances of the SCMs may adversely affect response performances to the host devices 210 and 220. However, in this embodiment, the regions of the mirror caches 112a and 122a are reserved in the high-speed DRAMs instead of the SCMs as illustrated in FIG. 10 to follow. For this reason, when the writing of the data is requested, at least part of an increase in processing time for the writing into the local cache attributed to the deterioration in the writing performance is offset by processing time for the mirroring into the mirror cache. Thus, it is possible to reduce the adverse effect on the write response performance to be caused by the reservation of the region of the local cache in the non-volatile memory device.

FIG. 10 is a sequence diagram illustrating an example of processing procedures of the storage device in the case where the writing is requested. As an example, FIG. 10 illustrates the case where the writing of the data is requested from the host device 210 to the CM 110. Note that in FIG. 10, processing by the CPU 111 corresponds to processing by the access control unit 111a, while processing by the CPU 121 corresponds to processing by the access control unit 121a.

After transmitting a write request command to the CM 110, the host device 210 transmits the write data (Step S11). On the part of the CM 110, the write data is received by the CA 116, and is transmitted to the CPU 111 through the PCIe switch (SW) 115 (Steps S12 and S13). At this time, the write data is temporarily stored in a buffer region of the DRAM 112.

The CPU 111 starts writing processing to read the write data out of the buffer region of the DRAM 112 and to write the data into the local cache 113a of the SCM 113 (Step S14). At the same time, the CPU 111 outputs to the DMA controller (DMAC) 118 an instruction for writing the write data into the DRAM 122 of the CM 120 (Step S15).

When the writing processing of the write data into the local cache 113a started in Step S14 is completed, the CPU 111 is notified of the completion (Step S16).

In the meantime, when the DMA controller 118 receives the instruction in Step S15, the DMA controller 118 reads the write data out of the buffer region of the DRAM 112, and transfers the data to the CM 120 (Step S17). The transferred write data is further transferred to the CM 120 through the PCIe switch (SW) 131 of the FRT 130 (Step S18). On the part of the CM 120, the write data thus transferred is received by the PCIe switch (SW) 125 through the DMA controller (DMAC) 128, and is transmitted to the CPU 121 (Step S19).

The CPU 121 writes the write data into the mirror cache 122a of the DRAM 122 (Step S20). When the writing is completed, the CPU 121 is notified of the completion (Step S21). The CPU 121 transmits a writing completion notification to the CM 110 (Step S22). The completion notification is transmitted to the DMA controller 118 of the CM 110 through the PCIe switch 125, and through the PCIe switch 131 of the FRT 130 (Steps S23 and S24). The DMA controller 118 notifies the CPU 111 of the completion of the write data by generating an interrupt, for example (Step S25).

The CPU 111 transmits the writing completion notification to the host device 210 (Step S26). The writing completion notification is transmitted to the host device 210 through the PCIe switch 115 and the CA 116 (Steps S27 and S28).

In the above-described processing of FIG. 10, the CPU 111 of the CM 110 stands by for completion of both sessions of the writing processing which is started in Step S14, and the writing processing the execution of which is instructed in Step S15. Then, upon completion of both sessions of the processing, the CPU 111 responds to the host device 210 in Step S28.

In the example of FIG. 10, the time spent for the writing processing instructed to be executed in Step S15 is longer than the time spent for the writing processing started in Step S14. As a consequence, the completion of the former writing processing is notified in Step S16, and then the completion of the latter writing processing is notified in Step S25. In this case, although the time spent for the writing into the local cache 113a is longer than that in the case where the region of the local cache 113a is reserved in the DRAM, the time spent for the response to the host device 210 is not delayed. Accordingly, the reservation of the region of the local cache 113a in the non-volatile memory device does not adversely affect the write response performance.

Meanwhile, even if the time spent for the former writing processing is longer than the time spent for the latter writing processing, the amount of increase in write response time based on the case where the region of the local cache 113a is reserved in the DRAM is limited to a temporal difference between the former writing processing and the latter writing processing. In this case, the majority of the amount of increase in time to write in the local cache 113a is offset by the time spent for the mirroring processing. For this reason, the reservation of the region of the local cache 113a in the non-volatile memory device has a small impact on the write response performance.

Therefore, according to this embodiment, saving processing of the cache data in case of a blackout does not have to be conducted. Thus, it is possible to suppress costs of the device and the size of the housing, and not to invite a significant drop in the write response performance to the host device 210.

Figure 11:
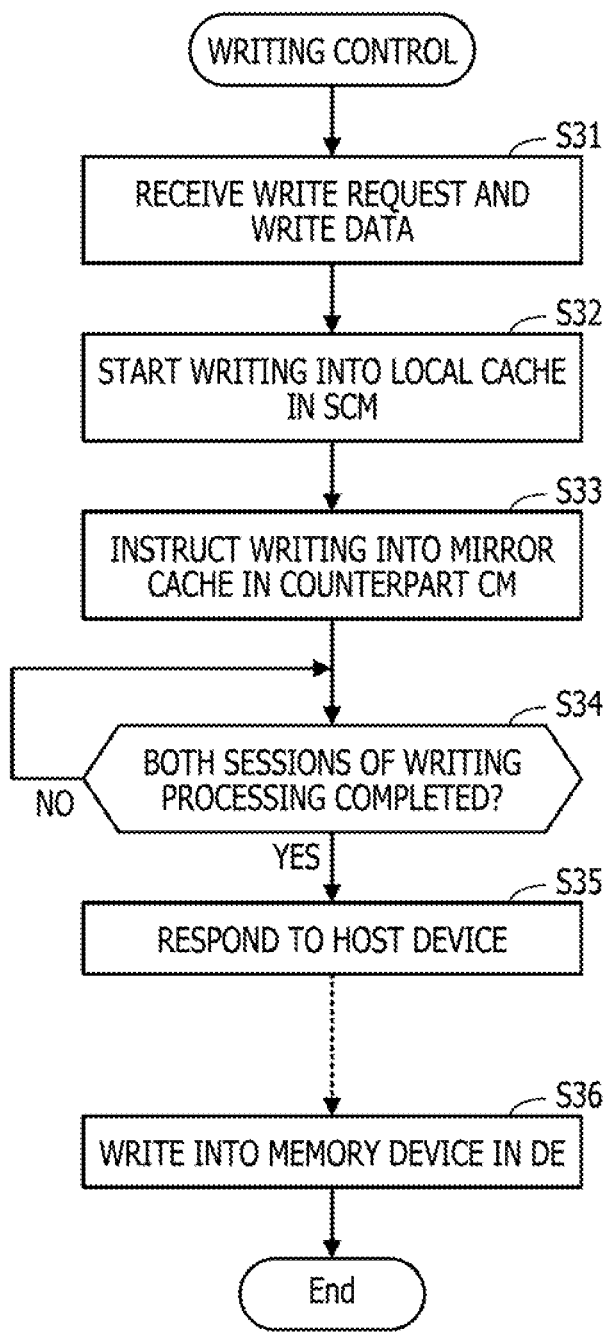
FIG. 11 is a flowchart illustrating a processing example of writing control by an access control unit.

FIG. 11 is a flowchart illustrating a processing example of writing control by an access control unit. As an example, FIG. 11 illustrates the processing by the access control unit 111a of the CM 110.

[Step S31] The access control unit 111a receives from the host device 210 a request for writing into the logic volume, and also receives the write data.

[Step S32] The access control unit 111a starts the processing to write the received write data into the local cache 113a of the SCM 113.

[Step S33] The access control unit 111a instructs the DMA controller 118 to write the received write data into the mirror cache 122a of the DRAM 122 of the CM 120. In response to the instruction, the DMA controller 118 transfers the write data to the CM 120 through the PCIe switch 131 of the FRT 130.

Note that the processing order of the Steps S32 and S33 is invertible.

[Step S34] The access control unit 111a determines whether or not both sessions of the writing processing started in Step S32 and the writing processing instructed in Step S33 is completed. If one of the processing is not completed, the access control unit 111a executes the processing of Step S34 again after a lapse of a certain period of time. On the other hand, the access control unit 111a executes processing in Step S35 when both sessions of the writing processing are completed.

[Step S35] The access control unit 111a responds to the host device 210 in order to notify the host device 210 of the completion of the writing.

[Step S36] At a given timing after the execution of Step S35, the access control unit 111a writes the write data, which is written into the local cache 113a in Step S32, into the corresponding memory device in the DE 140. The timing to execute Step S36 is set to a timing when a free space in the local cache region 113a runs short and a frequency of access to the write data written in Step S32 reaches the lowest in the local cache 113a, for example.

Figure 12:
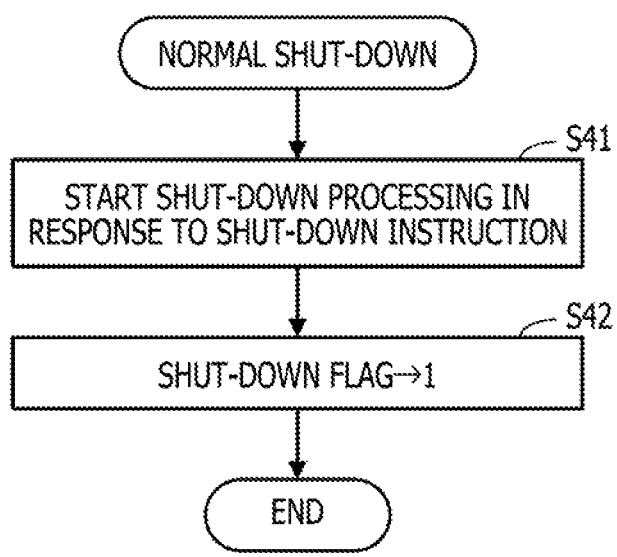
FIG. 12 is a flowchart illustrating a processing example of a CM in the case of a normal shut-down.

Next, FIG. 12 is a flowchart illustrating a processing example of a CM in the case of a normal shut-down. As an example, FIG. 12 describes the case where the CM 110 shuts down normally. Note that at the time to start the processing in FIG. 12, the shut-down flag 119 is assumed to be set to "0".

[Step S41] The start-up control unit 111b of the CM 110 starts shut-down processing in response to a shut-down instruction. The shut-down instruction is issued from an external device such as one of the host devices 210 and 220, and a management terminal. Alternatively, the shut-down instruction may be issued in response to an operation of a shut-down switch to be mounted on the CM 110 or the storage device 100.

[Step S42] The start-up control unit 111b updates the shut-down flag 119 from t"0" to "1". This update processing is included in the shut-down processing. The operation of the CM 110 is stopped when the shut-down processing is completed.

Note that the shut-down flag 119 remains at "0" without being updated when the operation of the CM 110 is abnormally stopped due to the blackout.

Figure 13:
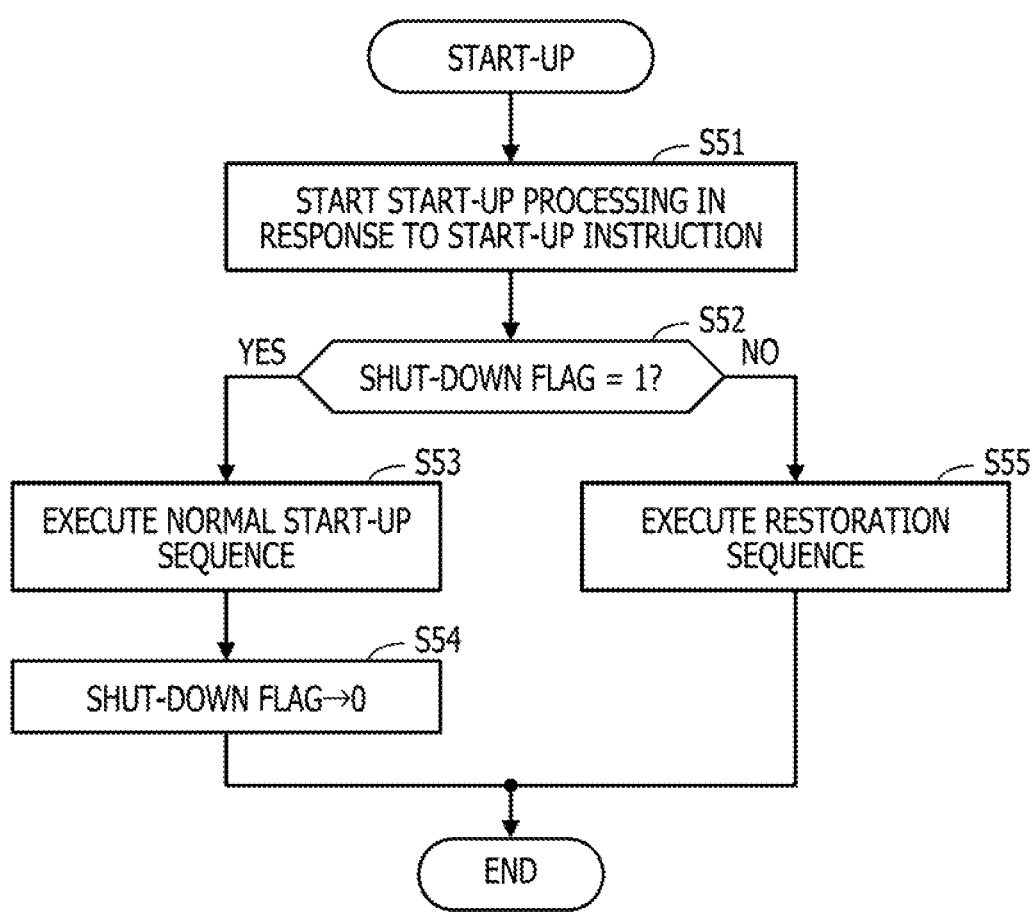
FIG. 13 is a flowchart illustrating a processing example of the CM at the time of start-up.

FIG. 13 is a flowchart illustrating a processing example of the CM at the time of start-up. As an example, FIG. 13 describes the case where the CM 110 starts up.

[Step S51] The start-up control unit 111b of the CM 110 starts the start-up processing in response to a start-up instruction. The start-up instruction is issued in response to an operation of a start-up switch to be mounted on the CM 110 or the storage device 100, for example.

[Step S52] The start-up control unit 111b reads the shut-down flag 119 and checks the value therein. The start-up control unit 111b executes processing in Step S53 when the shut-down flag 119 is set to "1", or executes processing in Step S55 when the shut-down flag 119 is set to "0".

[Step S53] The start-up control unit 111b determines that the CM 110 started up normally at the time of last shut-down, and executes a normal start-up sequence.

[Step S54] By executing the normal start-up sequence, the access control unit 111a reaches a state of being able to start the access control to the logic volume LV1. When the normal start-up sequence is completed, the start-up control unit 111b updates the shut-down flag 119 from "1" to "0". After this update, the access control by the access control unit 111a is started.

[Step S55] The start-up control unit 111b determines that the CM 110 is stopped abnormally last time, and executes a restoration sequence. The restoration sequence includes processing to recover the data in the mirror cache 122a in the DRAM 122 by causing the start-up control unit 111b to write the data stored in the local cache 113a into the DRAM 122 of the CM 120. When the restoration sequence is completed, the access control to the logic volume LV1 by the access control unit 111a is started.

As described above, the start-up control unit 111b is capable of determining the latest stop condition of the CM 110 based on the shut-down flag 119. Moreover, when the start-up control unit 111b determines that the CM 110 is abnormally stopped, the start-up control unit 111b is capable of recovering the data in the mirror cache 122a of the counterpart CM 120 by using the data held in the local cache 113a. When the CM 110 starts up after the abnormal stop as described above, the local cache 113a does not have to be recovered. Hence, it is possible to reduce the time spent for enabling the access control unit 111a of the CM 110 to start the access control.

Note that in Step S52, the start-up control unit 111b my execute the processing in Step S55 when the start-up control unit 111b checks not only the shut-down flag 119 in the CM 110 but also the shut-down flag 129 in the CM 120 being set to "0". In this way, the start-up control unit 111b is capable of determining that not only the CM 110 but also the CM 120 are stopped at the last stoppage of the CM 110, and thus accurately judging that the cause of the last stoppage is attributed to the blackout.

[Third Embodiment]

Figure 14:
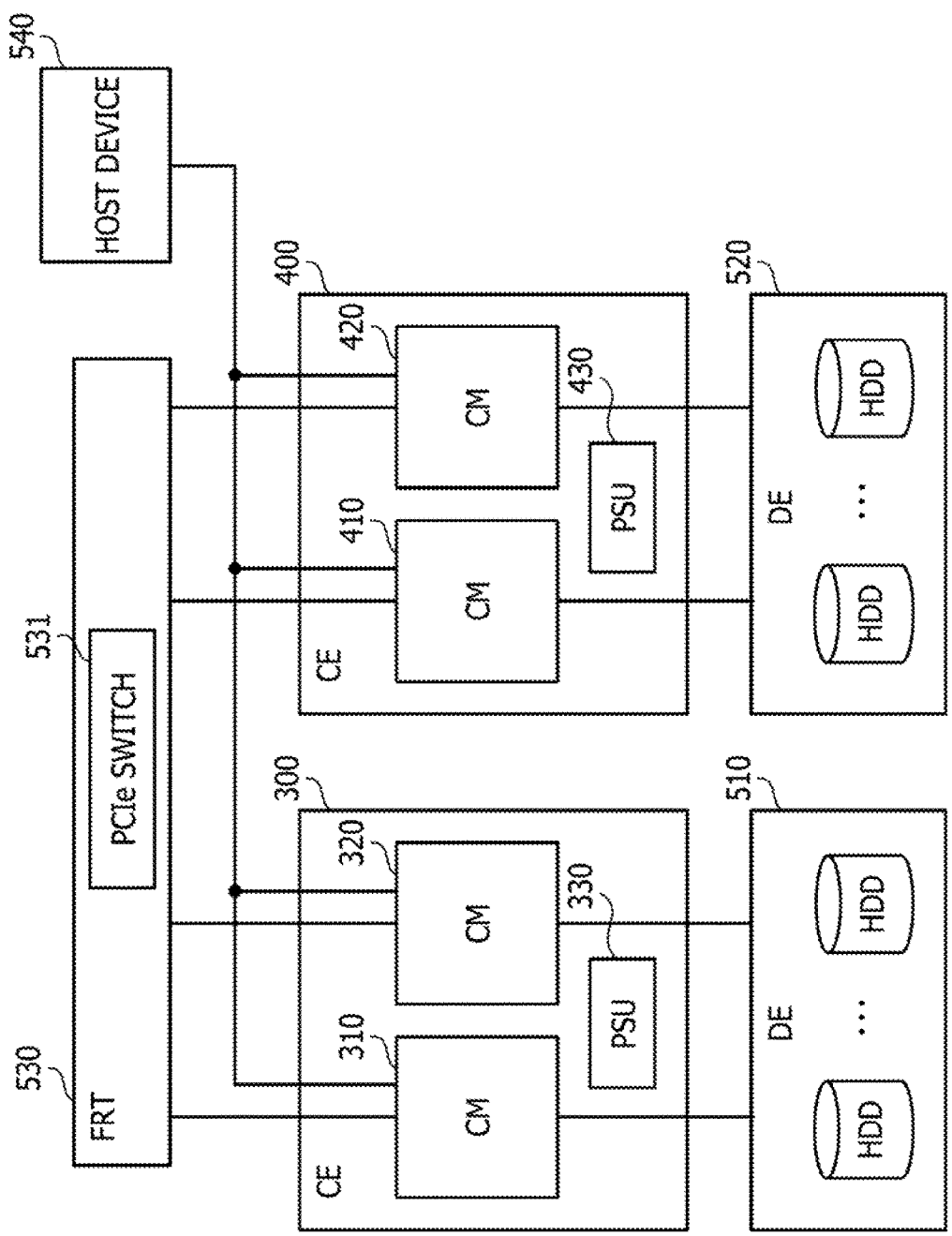
FIG. 14 is a diagram illustrating a configuration example of a storage system according to a third embodiment.

FIG. 14 is a diagram illustrating a configuration example of a storage system according to a third embodiment. The storage system illustrated in FIG. 14 includes controller enclosures (CEs) 300 and 400, DEs 510 and 520, an FRT 530, and a host device 540.

The CE 300 includes CMs 310 and 320, and a PSU 330. The CE 400 includes CMs 410 and 420, and a PSU 430. The CMs 310, 320, 410, and 420 are coupled to one another through the FRT 530. Moreover, the host apparatus 540 is coupled to the CMs 310, 320, 410, and 420 through an SAN using Fibre Channel or iSCSI, for example. Although FIG. 14 illustrates the example of coupling the single host apparatus 540 to the CMs 310, 320, 410, and 420, two or more host apparatuses, for example, may be coupled to one or more CMs, respectively.

The DE 510 is coupled to the CMs 310 and 320 while the DE 520 is coupled to the CMs 410 and 420. Multiple memory devices as access targets from the host device 540 are mounted on the DEs 510 and 520. For example, in this embodiment, each of the DEs 510 and 520 is a disk array device provided with HDDs as the memory devices. The CMs 310 and 320 control the access to the memory devices mounted on the DE 510. The CMs 410 and 420 control the access to the memory devices mounted on the DE 520.

The PSU 330 supplies electric power to the CMs 310 and 320 based on electric power supplied from outside. The PSU 430 supplies electric power to the CMs 410 and 420 based on electric power supplied from outside. It is to be noted, however, that the electric power is supplied to the PSUs 330 and 430 from a common outside power source. For this reason, all the CMs 310, 320, 410, and 420 stop operation in the event of a blackout.

Here, all the CMs 310, 320, 410, and 420 have the same hardware configuration as that of the CMs 110 and 120 illustrated in FIG. 3. Accordingly, each of the CMs 310, 320, 410, and 420 includes a DRAM and an SCM.

In the meantime, the number of the CEs included in the storage system is not limited to two, and the number of the CMs included in each CE is not limited to two. For instance, the storage system may include twelve DEs each provided with two CMs.

The FRT 530 includes a PCIe switch 531. The CMs 310, 320, 410, and 420 are capable of communicating with one another through the PCIe switch 531 of the FRT 530.

Figure 15:
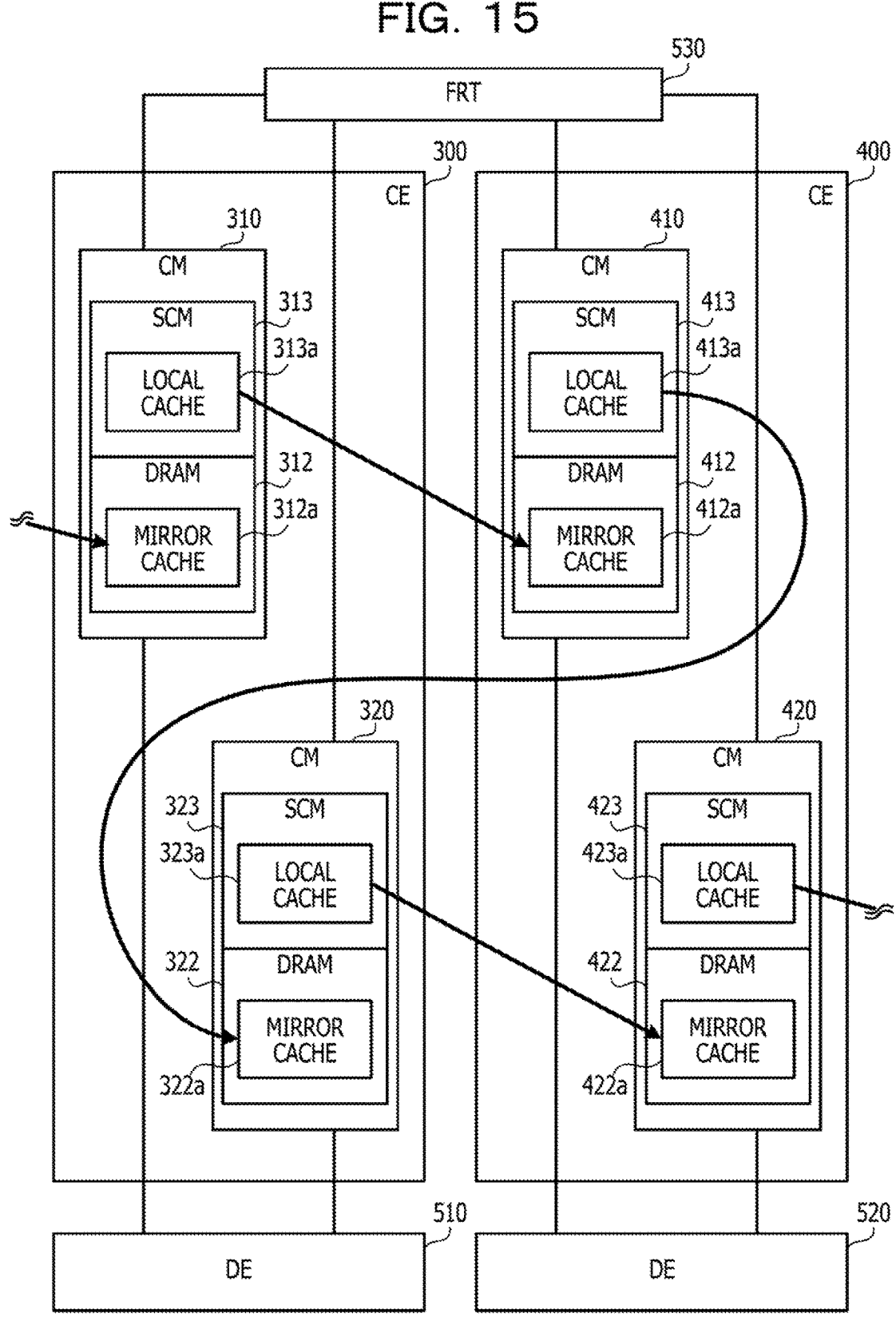
FIG. 15 is a diagram illustrating relations among local caches and mirroring destinations therefrom.

FIG. 15 is a diagram illustrating relations among local caches and mirroring destinations therefrom. In the storage system of this embodiment, data reading and writing between each CM and the host device 540 is performed base on the corresponding logic volume. Multiple logic volumes are set in the storage system, and a CM is allocated to each logic volume, such that the CM controls access from the host device 540 to the corresponding logic volume. The CM controls the access to the logic volume allocated thereto by using a region of the local cache reserved in the SCM in the CM. The region of the local cache for the logic volume is reserved in each SCM.

In order to facilitate the explanation, each of the CMs 310, 320, 410, and 420 in FIG. 15 is assumed to control the access to one logic volume in response to an access request from the host device 540. In this case, the region of one of local caches 313a, 323a, 413a, and 423a is reserved in each of SCMs 313, 323, 413, and 423 of the CMs 310, 320, 410, and 420.

Here, physical memory regions corresponding to the respective logic volumes are realized by one or more HDDs mounted on the DEs 510 and 520. In the simplest example, the physical memory region corresponding to the logic volume subject to the access control by a certain CM is realized by one or more HDDs in the DE coupled to the certain CM. For instance, one or more HDDs in the DE 510 are allocated to the physical memory region corresponding to the logic volume subject to the access control by the CM 310.

Moreover, the regions of mirror caches 312a, 322a, 412a, and 422a are reserved in DRAMs 312, 322, 412, and 422 of the CMs 310, 320, 410, and 420, respectively. Data in the local caches are mirrored into the corresponding mirror caches 312a, 322a, 412a, and 422a, respectively.

The mirroring destinations of the data in the local caches are allocated as follows. The data in the local cache 313a of the CM 310 is mirrored into the mirror cache 412a of the CM 410. The data in the local cache 413a of the CM 410 is mirrored into the mirror cache 322a of the CM 320. The data in the local cache 323a of the CM 320 is mirrored into the mirror cache 422a of the CM 420. The data in the local cache 423a of the CM 420 is mirrored into the mirror cache 312a of the CM 310.

As described above, the local cache of a certain one of the CMs is cyclically mirrored into the CM in the adjacent CE. In this case, the local cache of the certain CM is naturally mirrored into the CM in the CE which is different from the CE that mounts the certain CM. This configuration makes it possible to use one of the local cache and the mirror cache for every logic volume in case the operation of any of the CEs is stopped, and thus to improve availability thereof.

For example, the data in the local cache 313a of the CM 310 is assumed to be mirrored into the mirror cache 322a of the CM 320. If the operation of the CE 300 is stopped in this configuration, both the local cache 313a and the mirror cache 322a are unusable and the corresponding logic volume thus becomes inaccessible.

In contrast, in the example of FIG. 15, the data in the local cache 313a of the CM 310 is mirrored into the mirror cache 412a of the CM 410. In this way, the data in the mirror cache 412a is usable even if the operation of the CE 300 is stopped. Accordingly, the CM 410 is capable of taking over the access control to the corresponding logic volume by using the data in the mirror cache 412a. On the other hand, even if the operation of the CE 400 is stopped, the CM 310 is capable of continuing the access control to the corresponding logic volume by using the data in the local cache 313a.

Here, each of the CMs 310, 320, 410, and 420 has the same processing functions as those of the access control unit 111a (or the access control unit 121a) and the start-up control unit 111b (or the start-up control unit 121b) illustrated in FIG. 4. Note that the processing of the access control unit and the start-up control unit provided to each of the CMs 310, 320, 410, and 420 are realized by causing the CPU embedded in each of the CMs 310, 320, 410, and 420 to execute given programs.

For example, when a request for writing is issued from the host device 540, the access control unit of the CM 310 writes the write data into the local cache 313a of the CM 310 and also into the mirror cache 412a of the CM 410. When the writing operations into the local cache 313a and the mirror cache 412a are completed, the access control unit of the CM 310 notifies the host device 540 of the completion of the writing.

In the above-described CM 310, since the region of the local cache 313a is reserved in the non-volatile SCM 313, the data in the local cache 313a is maintained without being lost even when the operations of the CEs 300 and 400 are stopped due to a blackout. Accordingly, a battery or another non-volatile memory device for backup does not have to be provided. Thus, it is possible to suppress a manufacturing cost as well as a housing size of the CM 310.

In addition, at least part of an increase in processing time for the writing attributed to reservation of the region of the local cache 313a in the SCM 313 instead of the DRAM is offset by processing time for the mirroring into the mirror cache 412a. Thus, it is possible to reduce an adverse effect on the write response performance to be caused by the reservation of the region of the local cache 313a in the SCM 313.

In the meantime, when the CM 310 starts up as the power supply is recovered from the blackout, the start-up control unit 111b of the CM 310 transfers the data in the local cache 313a to the CM 410, thus restoring the data in the mirror cache 412a. Since the local cache 313a does not have to be recovered at the time of power recovery, it is possible to reduce the time spent for enabling the access control unit of the CM 310 to start the access control.

Note that the processing functions of the devices (such as the storage control devices 10 and 20, and the CMs 110, 120, 310, 320, 410, and 420) in the above-described embodiments are realizable by a computer. In this case, the processing functions are realized on the computer by providing the computer with programs describing processing contents of the functions to be imparted to the devices, and causing the computer to execute the programs. The programs describing the processing contents may be recorded in a computer-readable recording medium. Examples of the computer-readable recording medium include a magnetic memory device, an optical disc, a magneto-optical recording medium, a semiconductor memory, and the like. Examples of the magnetic memory device include a hard disk drive (HDD), a flexible disk (FD), a magnetic tape, and the like. Examples of the optical disc include a digital versatile disc (DVD), a DVD-RAM, a compact disc-read only memory (CD-ROM), a CD-R(recordable)/RW(rewritable), and the like. Examples of the magneto-optical recording medium include a magneto-optical disk (MO) and the like.

In the case of circulating the programs, portable recording media such as DVDs or CD-ROMs recording the programs are sold. Alternatively, it is also possible to store the programs into a memory device in a server computer, and to transfer the programs from the server computer to other computers through a network.

The computer to execute the programs stores the programs recorded in the portable recording medium or the programs transferred from the server computers into a memory device in the computer. Then, the computer reads the programs out of its memory device and executes the processing in accordance with the programs. Here, the computer may receive the programs directly from the portable recording medium and execute the processing in accordance with the programs. Alternatively, the computer may also execute the processing step by step in accordance with received portions of the programs, which are transferred from the server computer coupled to the computer through the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system comprising:
    a first storage control device including a first memory and a first processor coupled to the first memory, the first memory being a volatile memory; and
    a second storage control device including a second memory and a second processor coupled to the second memory, the second memory being a non-volatile memory, wherein
    the second processor is configured to
    receive a first write request to write first data into a first storage device,
    store the first data into the second memory, and
    transmit the first data to the first storage control device,
    the first processor is configured to
    receive the first data from the second processor,
    store the first data into the first memory, and
    transmit a first notification to the second storage control device after storing the first data into the first memory, and
    the second processor is configured to
    receive the first notification from the first processor,
    transmit a first completion notification in response to the first write request after storing the first data into the second memory and receiving the first notification,
    execute processing to write the first data, stored in the second memory, into the first storage device,
    record normal stoppage information indicating normal stoppage of the second storage control device when the second storage control device is stopped in response to a stop request, and
    transmit the first data stored in the second memory to the first storage control device when the second storage control device starts up and the normal stoppage information is not recorded.

2. The storage system according to claim 1, wherein the processing to write the first data into the first storage device is executed after the first completion notification is transmitted.

3. The storage system according to claim 2, wherein the second memory includes a cache region,
    the first data is stored in the cache region,
    the first memory includes a mirroring region, and
    the first data is stored in the mirroring region.

4. The storage system according to claim 3, wherein the second processor is configured to transmit the first data stored in the cache region to the first storage control device when the first storage control device and the second storage control device start up from an operation-stopped state attributed to a blackout, and
    the first processor is configured to store the first data transmitted from the second processor into the mirroring region.

5. The storage system according to claim 3, wherein the first processor is configured to write the first data stored in the mirroring region into the first storage device when the second storage control device is stopped.

6. The storage system according to claim 3, wherein the first processor is configured to store the first data transmitted from the second processor into the mirroring region.

7. The storage system according to claim 3, further comprising:
    a third storage control device including a third memory and a third processor coupled to the third memory, the third memory being a volatile memory, wherein
    the first storage control device includes a fourth memory and a fourth processor coupled to the fourth memory, the fourth memory being a non-volatile memory,
    the fourth processor is configured to
    receive a second write request to write second data into a second storage device,
    store the second data into the fourth memory, and
    transmit the second data to the third storage control device,
    the third processor is configured to
    receive the second data from the fourth processor,
    store the second data into the third memory, and
    transmit a second notification to the first storage control device after storing the second data into the third memory, and
    the fourth processor is configured to
    receive the second notification from the third processor,
    transmit a second completion notification in response to the second write request after storing the second data into the fourth memory and receiving the second notification, and execute processing to write the second data, written in the fourth memory, into the second storage device.

8. The storage system according to claim 1, wherein the second memory is a storage class memory (SCM).

9. A storage control device comprising:
a memory being a non-volatile memory; and
a processor coupled to the memory configured to:
receive a first write request to write first data into a first storage device,
store the first data into the memory,
transmit the first data to another storage control device including another memory being a volatile memory and another processor coupled to the another memory,
receive a first notification which is transmitted from the another processor after the first data is stored in the another memory,
transmit a first completion notification in response to the first write request after storing the first data into the memory and receiving the first notification,
execute processing to write the first data, stored in the memory, into the first storage device,
record normal stoppage information indicating normal stoppage of the storage control device when the storage control device is stopped in response to a stop request, and
transmit the first data stored in the cache region to the another storage control device when the storage control device starts up and the normal stoppage information is not recorded.

10. The storage control device according to claim 9, wherein
the processing to write the first data into the first storage device is executed after the first completion notification is transmitted.

11. The storage control device according to claim 10, wherein
the memory includes a cache region,
the first data is stored in the cache region,
the another memory includes a mirroring region, and
the first data is stored in the mirroring region.

12. The storage control device according to claim 11, wherein
the processor is configured to transmit the first data stored in the cache region to the another storage control device when the storage control device and the another storage control device start up from an operation-stopped state attributed to a blackout, and
the another processor is configured to store the first data transmitted from the processor into the mirroring region.

13. The storage control device according to claim 11, wherein
the another processor is configured to write the first data stored in the mirroring region into the first storage device when the storage control device is stopped.

14. The storage control device according to claim 11, wherein
the another processor is configured to store the first data transmitted from the processor into the mirroring region.

15. The storage control device according to claim 9, wherein
the memory is a storage class memory (SCM).

16. A method of controlling a storage system including a first storage control device and a second storage control device, the first storage control device including a first memory being a volatile memory and a first processor coupled to the first memory, the second storage control device including a second memory being a non-volatile memory and a second processor coupled to the second memory, the method comprising:
receiving, by the second processor, a first write request to write first data into a first storage device;
storing, by the second processor, the first data into the second memory;
transmitting, by the second processor, the first data to the first storage control device;
receiving, by the first processor, the first data from the second processor;
storing, by the first processor, the first data into the first memory;
transmitting, by the first processor, a first notification to the second storage control device after storing the first data into the first memory;
receiving, by the second processor, the first notification from the first processor;
transmitting, by the second processor, a first completion notification in response to the first write request after storing the first data into the second memory and receiving the first notification;
executing, by the second processor, processing to write the first data, stored in the second memory, into the first storage device;
recording, by the second processor, normal stoppage information indicating normal stoppage of the second storage control device when the second storage control device is stopped in response to a stop request, and
transmitting, by the second processor, the first data stored in the second memory to the first storage control device when the second storage control device starts up and the normal stoppage information is not recorded.

17. The method according to claim 16, wherein
the processing to write the first data into the first storage device is executed after the first completion notification is transmitted.

18. The method according to claim 17, wherein
the second memory includes a cache region,
the first data is stored in the cache region,
the first memory includes a mirroring region, and
the first data is stored in the mirroring region.

19. The method according to claim 18, further comprising:
transmitting, by the second processor, the first data stored in the cache region to the first storage control device when the first storage control device and the second storage control device start up from an operation-stopped state attributed to a blackout; and
storing, by the first processor, the first data transmitted from the second processor into the mirroring region.

20. The method according to claim 18, further comprising:
writing, by the first processor, the first data stored in the mirroring region into the first storage device when the second storage control device is stopped.

* * * * *